(12) United States Patent
Irazábal et al.

(10) Patent No.: US 12,483,412 B1
(45) Date of Patent: Nov. 25, 2025

(54) SYSTEM AND METHOD TO SHORTEN CRYPTOGRAPHIC PROOFS

(71) Applicant: Codenotary Inc., Bellaire, TX (US)

(72) Inventors: Jerónimo Irazábal, Buenos Aires (AR); Moshe Bar, Houston, TX (US); Dennis Zimmer, Kuessnacht am Rigi (CH)

(73) Assignee: Codenotary Inc., Bellaire, TX (US)

( * ) Notice: Subject to any disclaimer, the term of this patent is extended or adjusted under 35 U.S.C. 154(b) by 61 days.

(21) Appl. No.: 18/623,758

(22) Filed: Apr. 1, 2024

Related U.S. Application Data

(63) Continuation of application No. 17/508,916, filed on Oct. 22, 2021, now Pat. No. 11,949,788.

(60) Provisional application No. 63/116,847, filed on Nov. 21, 2020.

(51) Int. Cl.
*H04L 9/32* (2006.01)
(52) U.S. Cl.
CPC .......... *H04L 9/3218* (2013.01); *H04L 9/3242* (2013.01)

(58) Field of Classification Search
CPC .......................... H04L 9/3218; H04L 9/3242
See application file for complete search history.

(56) References Cited

U.S. PATENT DOCUMENTS

| 12,309,257 B2 * | 5/2025 | Covaci | H04L 9/0637 |
| 2005/0114666 A1 * | 5/2005 | Sudia | H04L 9/3236 |
| | | | 713/175 |
| 2018/0006820 A1 * | 1/2018 | Arasu | G06F 16/00 |
| 2019/0349426 A1 * | 11/2019 | Smith | H04L 9/3239 |
| 2020/0021446 A1 * | 1/2020 | Roennow | H04L 9/0819 |
| 2020/0052886 A1 * | 2/2020 | Buldas | H04L 9/3247 |
| 2020/0073962 A1 * | 3/2020 | Natarajan | H04L 9/0643 |
| 2021/0152364 A1 * | 5/2021 | Beecham | G06F 16/27 |

* cited by examiner

*Primary Examiner* — Techane Gergiso
(74) *Attorney, Agent, or Firm* — J. Roger Williams, Jr.

(57) ABSTRACT

Disclosed herein are computer-implemented methods of, and computer systems for, constructing dual cryptographic proofs for transactions where transaction data is stored in a cryptographically-linked data file and in an incremental hash tree, where a dual cryptographic proof includes linear cryptographic proof data from the cryptographically-linked transaction file and binary cryptographic proof data from the incremental hash tree. The transaction may include one or more key-value pairs.

20 Claims, 13 Drawing Sheets

Fig. 1 transactions are appended to the end of the file including a cryptographic hash calculated from already appended data.

| 510 | Create transaction hash tree of key-value pairs $K_i0V_i0$-$K_inV_in$ |
|---|---|
| 520 | Compute root hash $eH_i$ from transaction hash tree of key-value pairs $K_i0V_i0$- $K_inV_in$ |
| 530 | Compute $LH_i$ = linear accumulative hash of metadata from immediately-previous transaction $i_{i-1}$, $LH_{i-1}$ and $eH_{i-1}$. |
| 540 | Construct transaction record $tx_i$ containing index i, $LH_i$, $eH_i$, key-value data |
| 550 | Append transaction record $tx_i$ to cryptographically-linked transaction data file |
| 560 | create new transaction leaf for incremental hash tree corresponding to transaction block $tx_i$ and containing index i, $LH_i$, and $eH_i$ |
| 570 | Append new transaction leaf to incremental hash tree and create intermediate hash nodes and recompute root hash value |

Fig. 5

| | | |
|---|---|---|
| 610 | | Create transaction hash tree of key-value pairs $K_i0V_i0 - K_inV_in$ |
| 620 | | Compute root hash $eH_i$ from transaction hash tree of key-value pairs $K_i0V_i0 - K_inV_in$ |
| 630 | | Obtain value for tj where tj identifies the position on the incremental hash tree of a successfully-inserted transaction leaf for a transaction block $tx_j$ |
| 635 | | Obtain value for tH where tH is the root hash of the incremental hash tree after successful insertion of the leaf transaction corresponding to transaction block $tx_j$ at position tj |
| 640 | | Compute $LH_i$ = linear accumulative hash of metadata from immediately-previous transaction $LH_{i-1}$, transaction number i, $tj_i$, $tH_i$, and $eH_i$. |
| 650 | | Construct transaction record $tx_i$ containing index i, tj, tH, $LH_i$, $eH_i$, and key-value data |
| 655 | | Append transaction record $tx_i$ to transaction data file |
| 660 | | create new transaction leaf for incremental hash tree corresponding to transaction block $tx_i$ and containing index i, $LH_i$, tj, tH, $eH_i$ |
| 670 | | Append new transaction leaf to incremental hash tree and create intermediate hash nodes and recompute root hash value |

Fig. 6

Fig. 7(a)
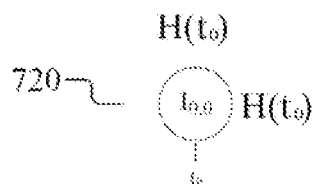
Fig. 7(b)
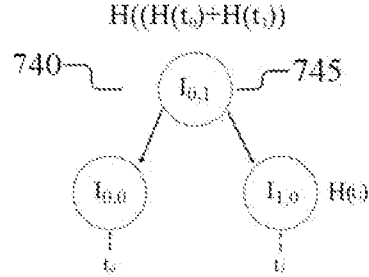
Fig. 7(c)
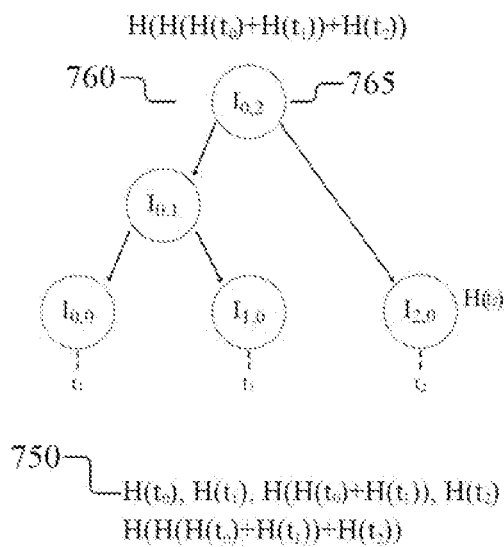
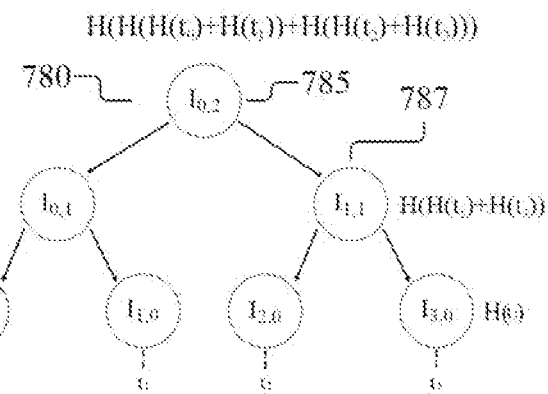
Fig. 7(d)

```
                                                      1010
func Alh(TxID, prevAlh, blTxID, blRoot, txH) {         /
return hash(txID + prevAlh + hash(blTxID + blRoot + txH))
}
```

FIG. 10(a)

```
                                                      1020
func LinearProof(trustedTxID, targetTxID) {            /
hashes[0] = Alh(trustedTxID)

for txID = trustedTxID+1; txID <= targetTxID; txID++ {
    tx = read(txID)
        append(hashes, hash(tx.blTxID + tx.blRoot + tx.txH))
} return hashes
}
```

FIG. 10(b)

```
                                                              1030
func VerifyLinearProof(proof, sourceTxID, targetTxID, sourceAlh,  /
targetAlh) { calculatedHash = proof[0]

for i = 1; i <= len(proof); i++ {
        calculatedHash = hash((sourceTxID+i) + CalculatedHash + proof[i])
    } return calculatedHash == targetAlh
}
```

FIG. 10(c)

```
                                                      1110
func DualProof(sourceTx, targetTx) {                 /
   var proof proof.sourceTxMetadata = metadata(sourceTx)
   proof.targetTxMetadata = metadata(targetTx)
                                                      1120
   if sourceTx.ID < targetTx.blTxID {                /
      // evaluation must match targetTx.blRoot
      proof.binaryInclusionProof = inclusionProof(sourceTx.ID, targetTx.blTxID)
   }
                                                      1130
   if sourceTx.BlTxID > 0 {                          /
      // evaluation must match with (sourceTx.BlRoot, targetTx.BlRoot)
      proof.binaryConsistencyProof = consistencyProof(sourceTx.BlTxID, targetTx.BlTxID)
   }
                                                      1140
   if targetTx.BlTxID > 0 {                          /
      targetBlTx = readTx(targetTx.BlTxID)
      // evaluation must match targetTx.BlRoot
      // Used to validate targetTx.BlRoot is calculated with alh@targetTx.BlTxID
      // as last leaf
      proof.lastInclusionProof = inclusionProof(targetTx.BlTxID, targetTx.BlTxID)
   }
                                                      1150
                                                     /
   proof.linearProof = linearProof(max(sourceTx.ID, targetTx.BlTxID), targetTx.ID)
   return proof
}

// data used to calculate the linear accumulative hash value up to tx
func metadata(tx) {
return (tx.ID, tx.prevAlh, tx.BlTxID, tx.BlRoot, tx.txH)
}
```

FIG. 11

```
func VerifyDualProof(proof, sourceTxID, targetTxID, sourceAlh, targetAlh) {
    if proof.sourceTxMetadata.ID != sourceTxID {
return false
    }                                                                          \
    if proof.targetTxMetadata.ID != targetTxID {                                1210
return false
    }
    if alh(proof.sourceTxMetadata) != sourceAlh {
return false
    }
    if alh(proof.targetTxMetadata) != targetAlh {
return false
    }                                                     1220
    if sourceTxID < proof.TargetTxMetadata.BlTxID {   /
        cTargetBlRoot = EvalInclusion(
           proof.BinaryInclusionProof,sourceTxID,
           proof.TargetTxMetadata.BlTxID,sourceAlh)
        if proof.TargetTxMetadata.BlRoot != cTargetBlRoot {
           return false
        }
    }                                                     1230
    if proof.SourceTxMetadata.BlTxID > 0 {                /
cSourceBlRoot, c2TargetBlRoot = EvalConsistency(
proof.BinaryConsistencyProof,
proof.SourceTxMetadata.BlTxID,
proof.TargetTxMetadata.BlTxID)

if proof.SourceTxMetadata.BlRoot != cSourceBlRoot ||
    proof.TargetTxMetadata.BlRoot != c2TargetBlRoot {
    return false
}
    }                                                     1240
    if proof.TargetTxMetadata.BlTxID > 0 {                /
        c2TargetBlRoot = EvalLastInclusion(
           proof.BinaryLastInclusionProof,
           proof.TargetTxMetadata.BlTxID,
           proof.TargetBlTxAlh)

if proof.TargetTxMetadata.BlRoot != c2TargetBlRoot {
           return false
        }
    }                                                     1250
    if sourceTxID < proof.TargetTxMetadata.BlTxID {   /
        return VerifyLinearProof(
                proof.LinearProof,
                proof.TargetTxMetadata.BlTxID,
                targetTxID,
                proof.TargetBlTxAlh,
                targetAlh)
    }
    return VerifyLinearProof(
            proof.LinearProof,
            sourceTxID, targetTxID,
            sourceAlh, targetAlh)
}
```

FIG. 12

SYSTEM AND METHOD TO SHORTEN CRYPTOGRAPHIC PROOFS

CROSS-REFERENCE TO RELATED APPLICATIONS

This application claims the benefit of U.S. Provisional Application No. 63/116,847, filed on Nov. 21, 2020, and U.S. Nonprovisional application Ser. No. 17/508,916, filed on Oct. 22, 2021 and scheduled to issue as U.S. Pat. No. 11,949,788 on Apr. 2, 2024. The contents of all of the foregoing applications are incorporated in their entirety.

COMPUTER PROGRAM LISTING APPENDIXES

With this application, Applicant has also submitted via EFS-WEB two ASCII text file appendices containing computer program listings, namely, (a) the file named ComputerProgramListingAppendix_AHTREE.txt, containing 15,329 bytes, and created Dec. 1, 2020, and (b) the file named ComputerProgramListingAppendix_HTREE.txt, containing 4,023 bytes, and created Dec. 1, 2020, the contents of which two text files are incorporated in their entirety.

FIELD OF THE INVENTION

The present disclosure pertains to the storage of data, specifically immutable and verifiable data storage, and in particular capturing the state of stored data in cryptographically-linked data structures that support verification of data integrity using cryptographic proofs.

BACKGROUND OF THE INVENTION

Any data that is digitally stored may be subject to tampering, either due to hardware/software failures or bad intentioned actors. Several techniques may be employed to deal with undesired data modifications, such as encryption, checksums and cryptographic signatures. It is prudent to assume the existence of bad actors with complete access to the system, including to any cryptographic material. Note this assumption also considers any tampering attempt pursued by authorized users and system administrators.

Hash trees can be used to create digests that represent the state of an entire database at any given time, and to provide cryptographic proofs that demonstrate that 1) a given element has been successfully inserted into the database and 2) a database is consistent between two points in time. These cryptographic proofs and digests can provide robust guarantees about the validity of the state of the database.

Linear cryptographic linking provides the basis for a technical solution ensuring immutability. A current hash value calculated not only on the new data being incorporated but also with the previously calculated hash value provides a means to determine if any piece of data was modified. In order to provide an improved solution, linear cryptographic linking can be augmented with protocols based on cryptographic signatures or proof of work algorithms.

While linear cryptographic linking can be efficiently achieved, the amount of data required to prove data was not tampered grows linearly, which may become impractical when dealing with large datasets. Hash trees can be used to generate efficient cryptographic proofs, however insertion time is not bounded by a fixed value but grows at a logarithmic rate. Thus, the ability to store huge amounts of immutable data creates a need for smaller cryptographic proofs, such as cryptographic proofs with fewer elements.

BRIEF SUMMARY

Disclosed herein are computer-implemented methods of, and computer systems for, constructing cryptographic proofs performed under control of one or more computer systems. The computer system comprises a data store that comprises a cryptographically-linked transaction data file, which comprises a plurality of cryptographically-linked transaction records, and an incremental hash tree having a plurality of leaves, wherein each leaf corresponds to a different cryptographically-linked transaction record in the cryptographically-linked transaction file. The method includes receiving (over a communications channel) a first cryptographic proof request pertaining to a subject transaction that has been stored in a subject transaction record in the cryptographically-linked transaction data file, generating first cryptographic proof data pertaining to the subject transaction, wherein the first cryptographic proof data comprises binary cryptographic proof data from the incremental hash tree and linear cryptographic proof data from the cryptographically-linked transaction data file; and transmitting the first cryptographic proof data over the communications channel in response to the cryptographic proof request.

In an embodiment, the subject transaction comprises key-value data pairs. In embodiments, the linear cryptographic proof data comprises a hash value of cryptographic data in one or more preceding transaction records, and the binary cryptographic proof comprises a root hash value of the incremental hash tree. The root hash value of the incremental hash tree, in an embodiment, may be a prior root hash value calculated upon successful addition to the incremental hash tree of transaction data corresponding to a prior transaction.

BRIEF DESCRIPTION OF DRAWINGS

The description below may refer to the following drawings, wherein like numerals refer to like elements, and wherein:

FIG. 5 illustrates a method of constructing a new transaction record of a cryptographically-linked transaction data file.

FIG. 6 illustrates an alternative embodiment of a method of constructing a new transaction record of a cryptographically-linked transaction data file.

FIGS. 7(a)-7(d) illustrate an embodiment of a process for constructing an incremental hash file.

FIGS. 10(a)-10(c) contain pseudocode illustrating aspects of an embodiment of a linear cryptographic proof FIG. 11 contains pseudocode illustrating aspects of an embodiment of a dual cryptographic proof FIG. 12 contains pseudocode illustrating an embodiment of verification of a dual cryptographic proof.

DETAILED DESCRIPTION

An append-only key-value store can store data as key-value pairs and provide cryptographic proofs demonstrating data originality (or data integrity), i.e., that the data remains as originally stored, i.e., entries are not updated or deleted, at least without leaving a proper trace of it. This functionality can be improved by combining it with a Merkle Hash Tree.

Figure 13:
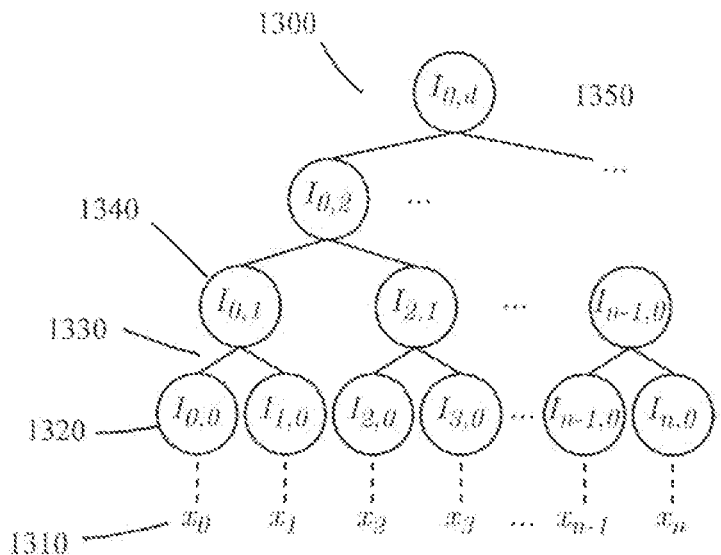
FIG. 13 illustrates an exemplary Merkle Hash Tree.
Figure 14:
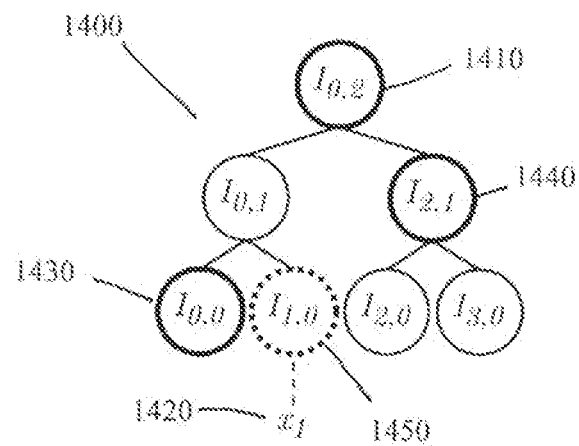
FIG. 14 illustrates an exemplary inclusion proof using a Merkle Hash Tree.
Figure 15:
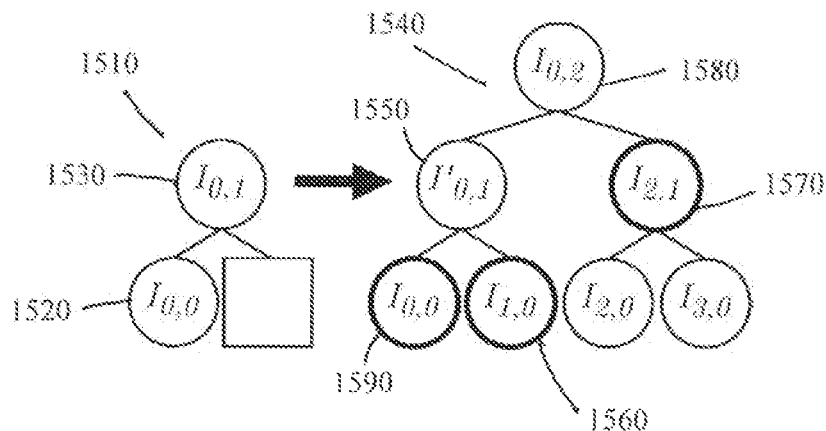
FIG. 15 illustrates an exemplary consistency proof using a Merkle Hash Tree.

Embodiments of a Merkle Tree or Merkle Hash Tree (MHT) are illustrated in FIGS. 13-15. Originally conceived by Ralph C. Merkle, these trees were conceived as digital signatures, attested to in a public shared file, to some underlying data. The primary motivation of the signature scheme at the time was to provide cryptographically secure signatures under certain circumstances while avoiding the computational expense (significant at the time) of using asymmetric key encryption by using computationally cheap hash functions instead. An embodiment of the operation of these trees is as follows:

(a) Some n data elements $x_0$ through $x_n$ is presented for signature. In Merkle's original conception, these are groups of message bits. In an embodiment it may be assumed that n mod 2=0. (b) Each of these n elements is digested using a hash function H, and for notational convenience each $H(x_i)$, $0<i<n$ is referred to as $X_i$. These $X_i$ values form the leaves of the MHT, each $X_i$ contained in a leaf node $I_{i,0}$ denoting its index i and its depth at the leaf layer, 0. More generally, for each node $I_{i,j}$, i is the index of the leftmost element in the subtree rooted at $I_{i,j}$, and j is the node's depth measured in path traversals up (i.e toward the root) from the leaf layer. (c) Assuming a binary tree, each pair of hashes at the leaf layer are concatenated and hashed, so $I_{0,1}=H(I_{0,0}\|I_{1,0})$. We thus assemble $I_{0,1}$, $I_{2,1}$, . . . , $I_{n-1,1}$ into n/2 trees, each of which is a hash of the concatenation of the hashes of two original elements. This process is repeated, $I_{0,2}=H(I_{0,1}\|I_{2,1})$ and so on, until a single tree has been created with root node $I_{0,log\ 2n}$.

The resultant tree has several properties that will prove to be important. First, the root node $I_{0,log\ 2n}$ is a digest of the entire tree, including all of the original data elements $x_0 \ldots x_n$. The alteration of any data element will alter the values at the roots of any subtree containing that value, including the overall tree. Second, the path from the root to any given leaf $I_{i,0}$ is unique. Third, given a data element $x_i$, and a tree root value, it is possible to construct a proof that $x_i$ is in the tree using a series of interior node values.

FIG. 13 illustrates an exemplary Merkle Hash Tree 1300. Each data element $x_i$ 1310 is hashed and put into leaf node $I_{i,0}$ (1320)=$H(x_i)$. Each pair $I_{i,0}$, $I_{i+1,0}$ (1330) is concatenated, hashed, and placed in interior tree node $I_{i,1}$ (1340). Each successive interior tree node consists of the hash of the left-to-right concatenation of the value of its children until a single root node $I_{0,d}$,d (1350)=$log_2$ n is created, representing a digest of the entire tree's state.

FIG. 14 illustrates an exemplary inclusion proof for a tree 1400 with root $I_{0,2}$ (1410) and data element $x_i$ (1420). The dashed circle 1450 indicates a derivable value; heavy circles 1430, 1440 are the values that must be provided to prove that $x_i$ (1420) was used in the construction of the tree (specifically as the ith element). The value of an MHT's root is the hash of the left-to-right concatenation of its children's values, and each of its children's values are the left-to-right concatenation of their children's, and so forth. In the case of a complete binary tree with depth 3 and 4 data elements, to prove the inclusion of $x_1$, in an embodiment it is necessary to provide the missing information to allow someone to generate $I_{0,2}$ given $x_1$.

$$I_{0,2} = H(I_{0,1}\|I_{2,1}) \quad (1)$$
$$= H(H(I_{0,0})\|I_{1,0})\|I_{2,1})$$
$$= H(H(I_{0,0})\|(H(x_1)\|I_{2,1})$$

The elements needed to show that $I_{1,0}$ (1440) (and by extension $x_1$ (1420)) was used at its indicated position to generate the tree 1400 rooted at $I_{0,2}$ (1410) are sibling $I_{0,0}$ (1430), its parent's sibling $I_{2,1}$ (1440) and the root (1410). The inclusion proof is the set $\{I_{0,0}; I_{2,1}; I_{0,2}\}$. More generally, for a given $x_i$, the inclusion proof set is its sibling and the sibling of each parent moving towards the root, which suffice to calculate the root from $x_i$. Proof validation is merely the calculation of the analog to Equation (1) above. This demonstrates an additional important property of the tree-inclusion proofs do not need to contain any data elements, preserving privacy of those data.

The introduction of growing MHTs also introduces a new class of incremental consistency proofs that demonstrate that some tree root value $I_q$ is a digest of a tree built from a valid superset of some other tree whose digest is $I_p$. That is, $I_q$ contains $I_p$ plus additional data elements. Such a proof consists of the interior values in $I_p$ nearest the root that also exist in $I_q$ sufficient to calculate $I_p$, as seen in FIG. 15.

FIG. 15 illustrates how, in an embodiment, the one-element tree at the left (1510) can be proved to be consistent with the tree (1540) on the right by providing the minimal set of leaves and nodes that proves the left tree 1510 can be calculated from the right ($I_{0,0}$ (1520), which can be used to calculate $I_{0,1}$ (1530), which is different from $I'_{0,1}$ (1550)), plus $I_{1,0}$ (1560) which can be used to calculate $I'_{0,1}$ (1550), and $I_{2,1}$ (1570) which, with the computed $I'_{0,1}$ (1550), can be used to calculate the root (1580) of the right tree. The necessary nodes are in heavy circles 1560, 1570, and 1590.

In an embodiment, a client transaction, which may include one or more key-value pairs, is stored with transaction metadata in an append-only data file and corresponding transaction metadata is stored as a transaction leaf in an incremental hash tree. The transaction metadata in the transaction record includes a hash value calculated on the one or more key-value pairs. The transaction record also includes a cryptographic link to the previous transaction in the form of a hash value of transaction metadata of the previous transaction. In an embodiment, the root hash (or digest) of the incremental hash tree is also included as part of the transaction metadata. The incremental hash tree may be built in synchrony with the transactions being appended or asynchronously, and the digest of the incremental hash tree may correspond to the state of the incremental hash tree after a previous transaction. In short, a transaction record may be cryptographically linked to the previous transaction and to the digest of the incremental hash tree of some or all prior transactions. With this structure it is possible to construct cryptographic proofs combining linear cryptographic linking—i.e., each transaction is cryptographically linked to the previous transaction—and binary cryptographic linking, i.e., each transaction includes the root hash value of the incremental hash tree. A cryptographic proof that combines linear and binary cryptographic linking is called a "dual proof."

The advantages of the improvements described herein include the following.

Immutability is guaranteed from the very beginning as data is initially committed into an append-only data file, and hash tree generation verifies that new data is cryptographically linked to previously-stored data. Additionally, cryptographic proofs may involve both cryptographic data-structures as actual client data is only stored in the append-only data store as part of a transaction. In an embodiment, a cryptographic proof that employs linear and binary linking data is shorter, or includes fewer elements, than a linear cryptographic proof.

In an exemplary application, one or more clients request storage of transactions, including, for example, transactions arranged as one or more key-value pairs. It is desirable that the storage be immutable, meaning that data once stored cannot be altered, and verifiable, meaning that the client or authorized third parties, can verify at any time that a specific transaction has been successfully added to the data file and that the data file has not been tampered with. In an embodiment, the computer system configured to store the transactions may include a user interface or application programming interface that enables the client to request cryptographic proofs. Exemplary embodiments include the following: a client may request a consistency proof and provide a root as input; a client may request cryptographic proofs based on a key or key-value combination; a client may fetch data relating to a transaction, for example, key value, data value, position value, and receive in response, in addition to the requested values, cryptographic proofs to demonstrate that the returned data was not tampered with; and a client may store key-value data, and in response receive, in addition to position information, cryptographic proofs to demonstrate that the transaction was stored.

Figure 1:
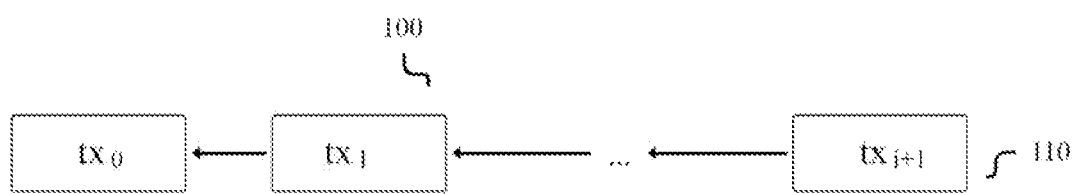
FIG. 1 illustrates an exemplary cryptographically-linked transaction data file.

FIG. 1 illustrates an exemplary cryptographically-linked transaction data file 100 containing one or more transaction records 110. Data file 100 can be used to store client transaction information, which may include one or more key-value pairs. In an embodiment, data file 100 is a linearly-linked append-only data file. In an embodiment, each transaction record 110 includes key-value data, which in an embodiment includes the one or more key-value pairs presented for storage, and cryptographic metadata, including a transaction index number (or transaction number), a hash value computed from the key-value pairs, and a linear hash computed from metadata in the previous transaction record.

Figure 2:
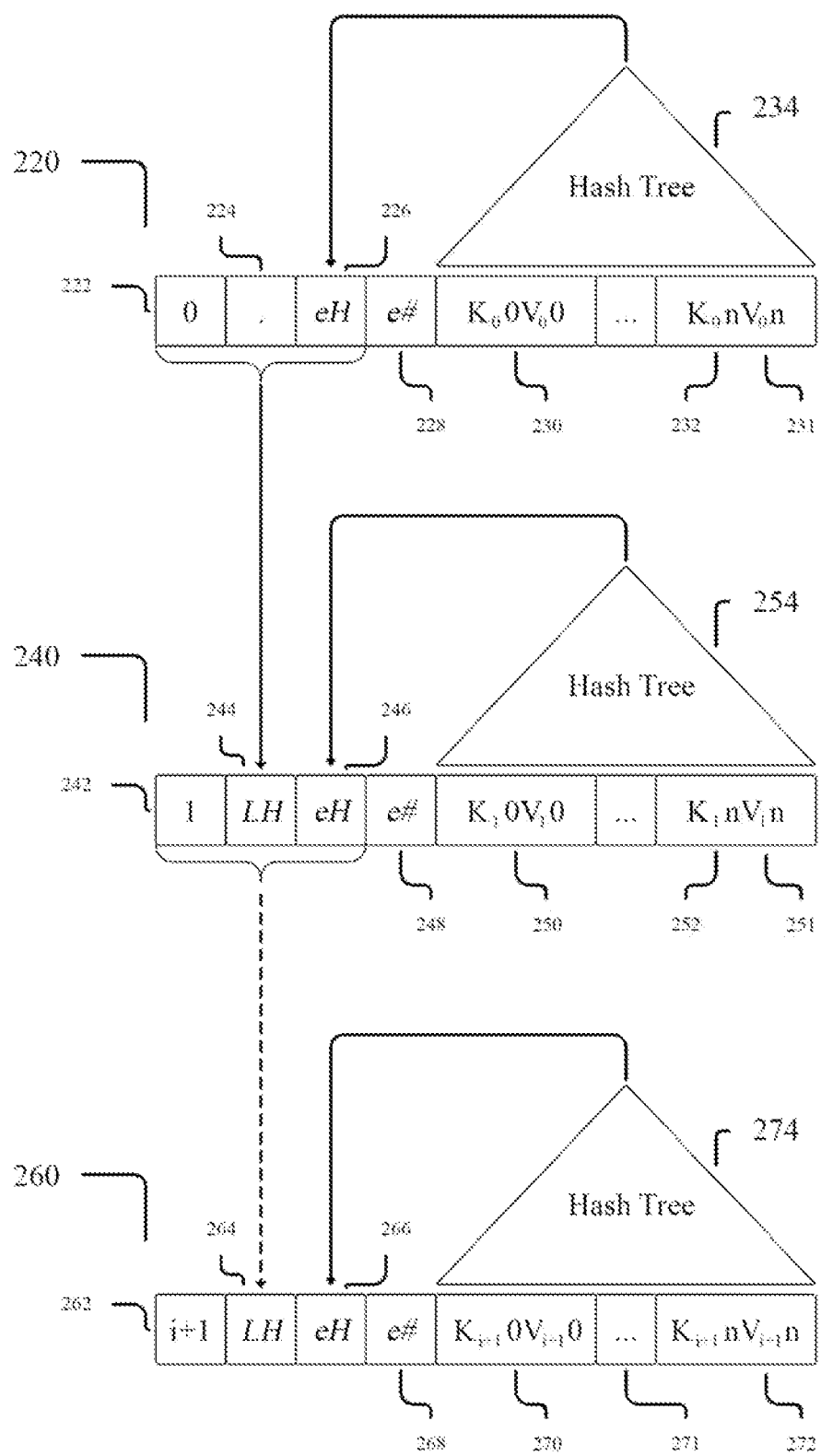
FIG. 2 illustrates an exemplary transaction record of a cryptographically-linked transaction data file.

FIG. 2 illustrates embodiments of a transaction record of a cryptographically-linked transaction data file. Transaction record 220 illustrates the initial transaction in the transaction data file. Transaction record 220 includes transaction number value 222, which is 0 for the initial transaction, LH field 224, entry hash (eH) value 226, and key-value data 231, which in an embodiment includes one or more key value pairs 230 to 232. The transaction record in an embodiment may include other values, such as e #228, the number of key-value pairs in the transaction, or the size or length of all key value pairs. Transaction record 240 illustrates the second transaction in the data file. Transaction record 240 includes transaction number value 242, which is 1 for the second transaction, LH field 244, entry hash (eH) value 236, optional e #value 238, key-value data 251, which in an embodiment includes one or more key value pairs 250 to 252. Transaction record 260 illustrates a transaction in the data file with transaction number i+1. Transaction record 260 includes transaction number value 262, i+1, LH field 264, entry hash (eH) value 266, optional eH value 268, and key-value data 271, which may include one or more key value pairs 270 to 272.

In an embodiment, transaction records 220, 240, and 260 include all key-value pairs. In an alternative embodiment, the key-value data stored in each transaction record (231, 251, 271) includes the key data (of the one or more key-value pairs), and the value data corresponding to each key is stored in another data file, which preferably is an append-only data file. In this embodiment, the transaction record includes the key data and the file name, address, offset, pointers, and other location data identifying where the corresponding value data is stored. Optionally, a hash value of the value data may be included in the transaction record. In yet another embodiment, the one or more key-value pairs are stored in another data file, which preferably is an append-only data file. In this embodiment, the transaction record includes the file name, address, offset, pointers, and other location data identifying where the one or more key-value pairs is stored.

In an embodiment, the separately-stored value data may be stored in a compressed format. Exemplary compression techniques and formats suitable for this purpose include GZIP (RFC 1952), LZW, ZLIB (RFC 1950), and DEFLATE (RFC 1951). In an embodiment, the separately-stored value data may also be encrypted by, for example, a symmetric cipher such as AES.

For each transaction record, the eH (entry Hash) value is the root hash or digest of the transaction hash tree calculated over all key-value pairs or other transaction elements. In an embodiment, the eH value is calculated on the current transaction values and is not related to and is independent of other transactions or previous calculation. In FIG. 2, the value of eH 226 in transaction record 220 is the digest of transaction hash tree 234 calculated over key value pairs 230-232; the value of eH 246 in transaction record 240 is the root hash of transaction hash tree 254 calculated over key value pairs 250-252; and the value of eH 266 in transaction record 260 is the root hash of transaction hash tree 274 calculated over key value pairs 270-272.

In an embodiment, each key-value pair (or collection of key-value pairs or other transaction elements) is stored as a leaf in a Merkle tree data structure and the eH value is the digest of this transaction hash tree. The transaction hash tree comprises all key-value pairs or other transaction elements in the current transaction, even in those embodiments in which value data or other transaction element is ultimately stored in a separate location other than the transaction record. In an embodiment in which value data is stored in compressed or encrypted form, the hash function preferably is applied to the uncompressed, unencrypted value data.

The digest of the transaction hash tree for the current transaction may be calculated with a bottom-up approach in which each element in the level immediately above is calculated as the hash of the two elements in the current levels. This procedure is followed until the current level is reduced to just one element, which is the root of the transaction hash tree. The preferred hash function, in an embodiment, is the SHA-256 cryptographic hashing function. Other hash functions, for example SHA-512, could also be used. By following this procedure, the digest can be recalculated from any leaf value and hashes from different levels of the tree.

For each transaction in the transaction data file, the LH hash value corresponds to and/or is calculated from the metadata in the immediate previous transaction. In an embodiment, the LH hash value is the current linear accumulative hash value of the transaction number, eH value, and LH value of the immediate previous transaction. In transaction 220, LH value 224 is null because there is no previous transaction. In transaction 240, LH value 244 is the current linear accumulative hash value of the transaction number 222 (0), the null LH value 224, and eH value 226 of transaction 220. Transaction 260 corresponds to the i+1$^{th}$ transaction number entry. In transaction 260, LH value 264 is the current linear accumulative hash value of the transaction number i, and the LH and eH values for the transaction with transaction number i (not shown). In an embodiment, the linear accumulative hash of a transaction may be calculated as the hash of the transaction number, linear accumulative hash of the previous transaction, root hash of the transaction entries, and other optional data such as a timestamp at which the transaction was added, number of entries, and similar information. SHA-256 is a preferred hash function but other hash functions, for example SHA-512, may also be used.

Figure 3:
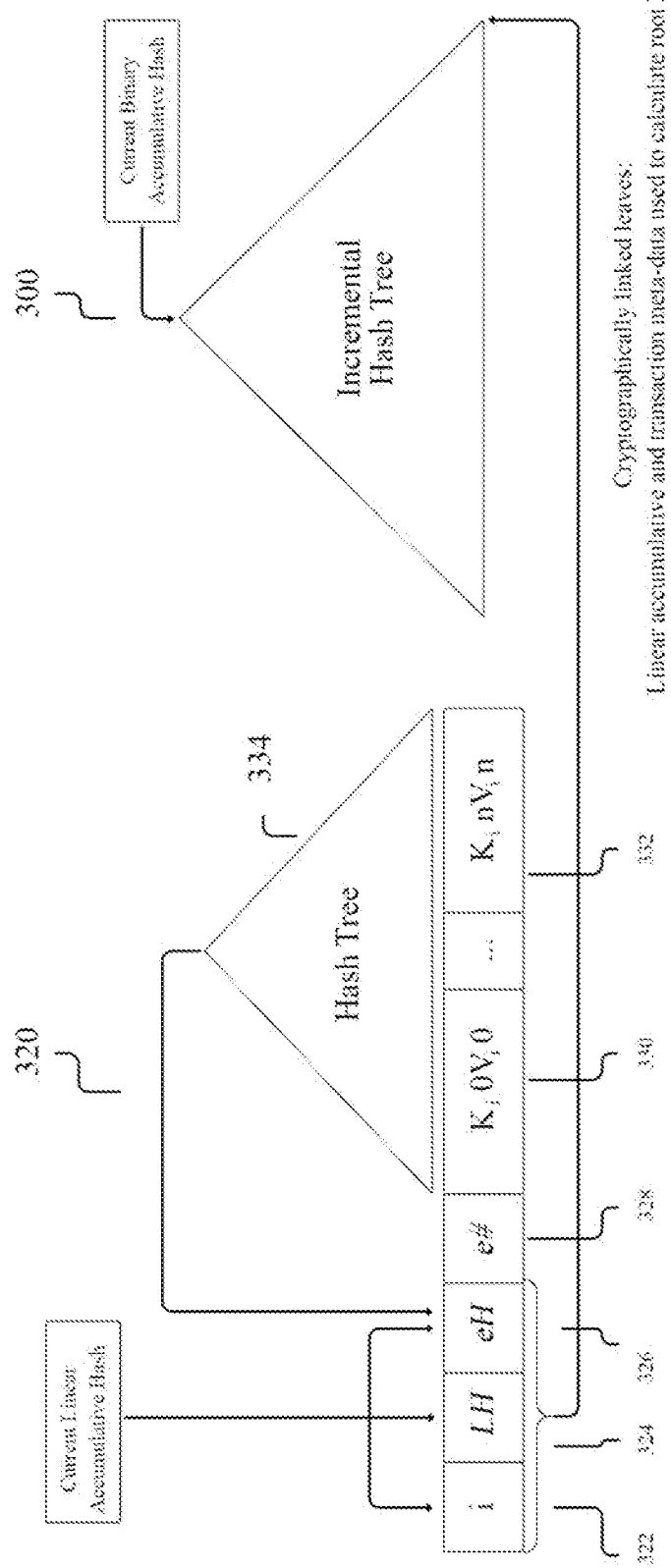
FIG. 3 illustrates an exemplary transaction leaf of an incremental hash tree.

FIG. 3 illustrates an embodiment of a transaction leaf 320 of an incremental hash tree 300. In embodiments, each leaf of the incremental hash tree corresponds to data stored in a transaction record in the transaction data file. Transaction leaf 320, in an embodiment, includes metadata corresponding to the transaction with transaction number i, including transaction number 322(i), LH value 324, and eH 326. The eH value 326 is the eH digest of the hash tree 334 computed over the key-value pairs 330-332 in the transaction with transaction number i. The transaction LH value 324 is the current linear accumulative hash value based on the transaction number, LH value, and eH value for the previous transaction (transaction number i−1). In an embodiment, the transaction leaf may contain hash values of one or more, or combinations, of, these values. Key-value pairs 330-332 preferably are not stored in transaction leaf 320. In an embodiment, optional transactional transaction metadata, for example, e #value 328, is not stored in transaction leaf 320.

FIG. 5 illustrates an exemplary method 500 for constructing a new transaction record for transaction number i containing n key-value pairs ($K_i0V_i0$-$K_inV_in$) to append to a transaction data file. In step 510, a transaction hash tree is created with the n key-value pairs $K_i0V_i0$-$K_inV_in$. as the leaves of the tree. In step 520, root hash $eH_i$ of the transaction hash tree is computed. In step 530, the value $LH_i$ is computed with a linear accumulative hash of metadata from immediately-previous transaction $i_{i-1}$, $LH_{i-1}$ and $eH_{i-1}$. In step 540, transaction record $tx_i$ is constructed containing transaction number i, $LH_i$, $eH_i$, key-value data corresponding to key-value pairs $K_i0V_i0$-$K_inV_in$, and optional values. (In an embodiment, key-value data may include the actual key-value pairs, or key data with pointers or other location information to where the value data is stored). In step 550, new transaction record $tx_i$ is appended to transaction data file 100. In step 560, a new transaction leaf is created containing metadata for transaction number i, including $LH_i$ or, in an embodiment, a hash of $LH_i$. In step 570, the new transaction leaf data is appended to the incremental hash tree, intermediate hash nodes are created, and the root hash value is recomputed.

Incremental hash tree 300 preferably is constructed incrementally as new transaction leaves are appended, without the need of recomputing the entire hash tree every time a new leaf is added. In an embodiment, incremental hash tree 300 is created and stored as a Merkle tree data structure. Preferably incremental hash tree 300 is a binary tree. In an embodiment, incremental hash tree 300 is stored external to, outside, or separately from the transaction data file. When a new transaction leaf is appended to the tree 300, a hash node containing a hash of the transaction leaf data is appended to the hash tree, intermediate hash nodes between the new hash node and the root are created and/or recomputed, and the root hash of the incremental hash tree is recomputed. The root hash of the incremental hash tree preferably, in an embodiment, reflects the data stored in each of the transaction leaves. A transaction leaf has been successfully appended to the incremental hash tree when the leaf has been linked to the tree and new hash values have been recomputed for the root and all intermediate nodes affected by the new transaction leaf.

In an alternative embodiment, as illustrated in FIG. 7, an incremental hash tree is created and stored in a linear append-only data file where each record contains a hash value of a transaction leaf or an intermediate hash node and the structure and content of the records implicitly define a Merkle tree structure. FIGS. 7(a)-7(d) illustrate the initial stages of an embodiment of a process 700 for constructing a linear incremental hash file.

FIG. 7(a) shows the contents of the first record of the linear incremental hash file 710 containing a hash value of the transaction leaf for the first transaction, to. The linear incremental hash file 710 implicitly defines a one-node Merkle tree 720 with root hash value $H(t_0)$. (In this discussion, H (x) refers to a cryptographic hash of x, and "+" is a concatenation operator.)

FIG. 7(b) shows the contents of the first 3 records of the linear incremental hash file 730 after the hash value of the transaction leaf for the second transaction, t1, has been appended, namely, $H(t_0)$, $H(t_1)$, and H ($H(t_0)$+$H(t_1)$). The last value is the hash value of the new root 745 of the Merkle tree 740 implicitly defined by incremental hash file 730.

FIG. 7(c) shows the contents of the first 5 records of the linear incremental hash file 750 after the hash value of the transaction leaf for the third transaction, $t_2$, has been appended, including additional records $H(t_2)$ and H(H(H ($t_0$)+$H(t_1)$)+$H(t_2)$). The last value is the hash value of the new root 765 of the Merkle tree 760 implicitly defined by incremental hash file 750.

FIG. 7(d) shows the contents of the first 8 records of the linear incremental hash file 770 after the hash value of the transaction leaf for the fourth transaction, $t_3$, has been appended, including additional records $H(t_3)$, H ($H(t_2)$+H ($t_3$)), and H(H(H($t_1$)+$H(t_2)$)+H ($H(t_2)$+$H(t_3)$)). The last two values are the hash values of the intermediate hash node 787 and the new root 785, respectively, of the Merkle tree 780 implicitly defined by incremental hash file 770.

In the foregoing embodiments of an incremental hash file, the root hash value is a binary accumulative hash value that reflects the contents of the entire incremental hash tree and is recomputed every time a new transaction leaf is added to the incremental hash tree.

Described here are processes of storing and cryptographically linking data corresponding to a client transaction. The linear linking process stores transaction data and linking metadata in a cryptographically-linked transaction data file (and, in an embodiment, stores value data in a separate data file). The binary linking process appends cryptographic transaction metadata to an incremental hash tree and updates the root hash value and other nodes of the hash tree (or, in an embodiment, adds new records to a linear incremental hash file that implicitly define the root and other nodes of the hash tree). Successfully appending a new transaction to the cryptographically-linked transaction data file requires fewer computations, fewer processing cycles, and less time to complete than successfully appending new transaction leaf data corresponding to the same transaction to the incremental hash tree. The time to update the incremental hash tree for each new transaction leaf is on the order of $\log_2 N$ (where N is the total number of transactions). As the transaction count increases, the binary linking process takes longer per transaction than the linear linking process. When the transaction count is on the order of millions or billions of transactions per day, as has been experienced in some applications, the time lag between the two processes can become significant.

Clients and others demand cryptographic proofs to confirm that transactions have been successfully stored and that the data file has not been tampered with. It is possible to return a cryptographic proof based on the values in a Merkle tree. However, the time to generate or verify a consistency and inclusion proofs for a Merkle tree grows at the rate of $\log_2 N$ as the number of transactions (N) increases. In other words, as the total transaction count increases, it takes more time to return a cryptographic proof. Alternatively, a cryptographic proof based on a linear linking process can be calculated in constant time, but it may not be returned more quickly and it may be longer. As described here, transactions may be stored in a transaction data file where each transaction record is cryptographically linked to the immediate previous one by including a hash value calculated from data present in the previous transaction. This improvement makes it possible to validate any transaction or subset of transactions by recalculating the hash values in or pertaining to a current transaction record using data contained in the current transaction and data or metadata of preceding transactions. While this cryptographic linking can be done in a constant amount of time, the number of values needed for the recalculation of the hash value included in the current transaction is determined by the number of preceding transactions. This approach is efficient when the number of transactions is low, but can become cumbersome when the number of transactions is on the order of millions or billions of transactions per day. For example, if a client requests a cryptographic proof for a linear cryptographic linking process, the response may include hundreds, thousands, or millions of values.

In an embodiment, the linear linking process (of appending transaction data to the cryptographically-linked transaction data file) and the binary linking process (of appending cryptographic transaction metadata to an incremental hash tree) can proceed asynchronously. In embodiments, the binary process can be performed continuously by a background process or thread, or performed in parallel by other processors or computers. In an embodiment, the linear process and the binary process can be synchronized. This approach affects performance, i.e., it takes longer to complete the process of successfully adding new key-value data, but enables the system to return a cryptographic proof (i.e., a process typically takes on the order of $\log_2 N$ steps) when the transaction is complete.

In an embodiment, linear and binary cryptographic linking processes can be combined to produce shorter cryptographic proofs (for example, with fewer elements), without sacrificing performance compared to cryptographic proofs based solely on linear cryptographic linking, yet maintaining the benefits of the binary cryptographic proofs.

Figure 4:
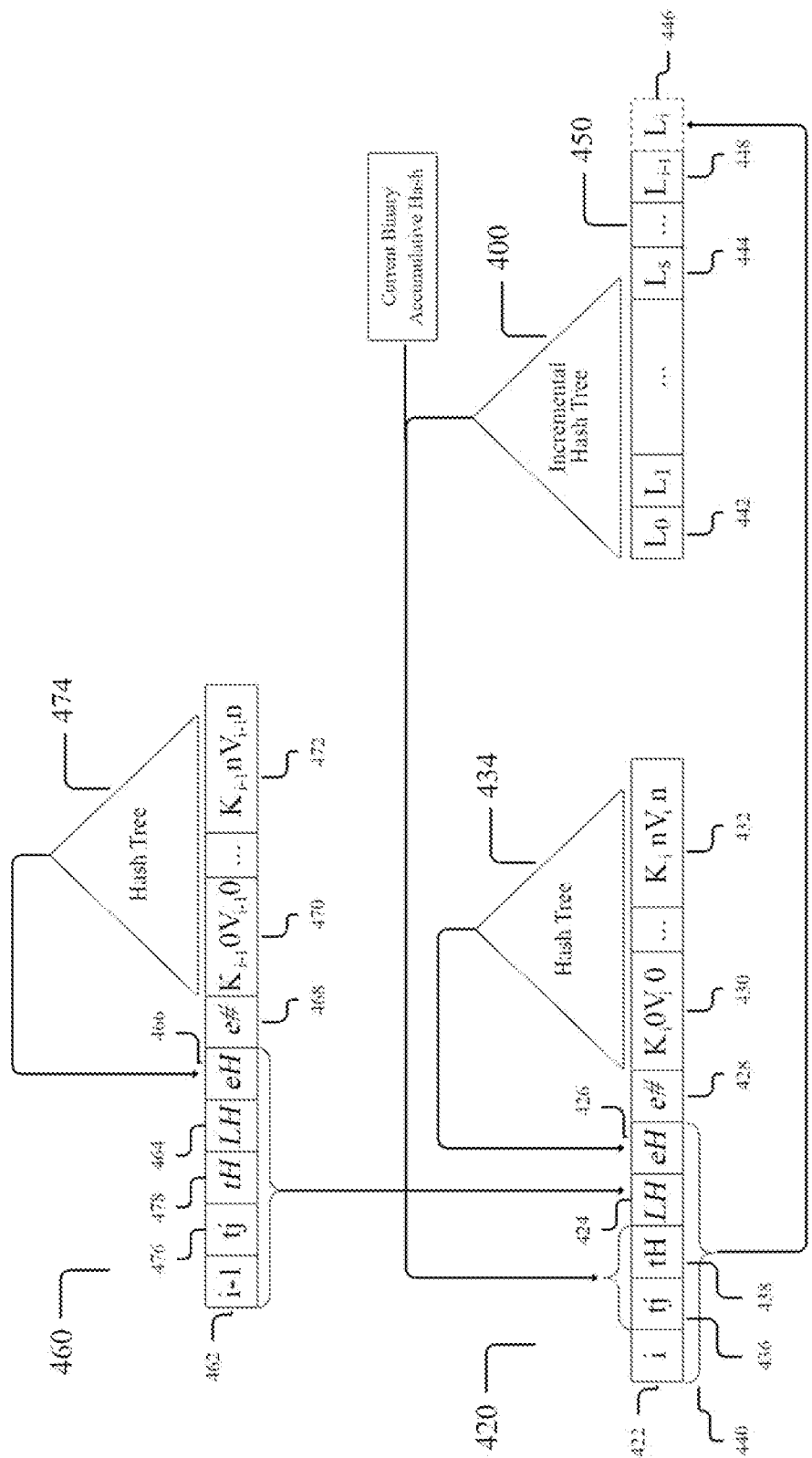
FIG. 4 illustrates an alternative embodiment of a transaction leaf in an incremental hash tree.

FIG. 4 illustrates the data structure of exemplary transaction records 420, 460 and transaction leaf 440 of an incremental hash tree 400 in an embodiment. Transaction record 460 illustrates the transaction record for transaction no. i–1 and includes transaction number value 462 (i–1), LH field 464, entry hash (eH) value 466, and optional e #value 468. In an embodiment, transaction record 460 includes one or more key value pairs 470 to 472. (In another embodiment, the data values corresponding to key value pairs 470-472, or the key-value pairs, are stored in another data store and transaction record 460 includes the file name, address, offset, or other location data identifying where the separately-stored data is stored.) Transaction 460 also includes, in an embodiment, tj 476 and tH 474 values for transaction 460 corresponding to transaction no. i–1.

Transaction record 420 illustrates the transaction record for transaction no. i and includes transaction number value 422(i), LH 424, entry hash (eH) value 426, optional e #value 428. In an embodiment, transaction 420 includes one or more key value pairs 430 to 432. The eH value 426 is the eH root hash of the transaction hash tree 434 computed over the key-value pairs 430-432 in the transaction with transaction number i. Transaction 420, in an embodiment, also includes additional values tj 436 and tH 438. Value tj 436 corresponds to the position on the incremental hash tree 400 of a successfully-inserted transaction leaf 444 for a transaction $tx_j$. Value tH 438 is the root hash of the incremental hash tree 400 after successful insertion of the transaction leaf 444 corresponding to transaction $tx_j$ at position tj. The transaction LH value 424 in an embodiment is the current linear accumulative hash value computed over the transaction number 462, LH value 464, eH value 466, tj value 476, and tH value 478 for the previous transaction 460 for transaction number i–1. In an alternative embodiment, the transaction LH value 424 is the current linear accumulative hash value computed over the transaction number 462, LH value 464, and a hash value computed over eH value 466, tj value 476, and tH value 478 for the previous transaction 460.

Data can be stored in transaction records 420, 460 in different configurations, formats, and embodiments, as illustrated herein. Any one or more fields or combinations of fields in transaction records 420, 460 may be stored in a transaction data file as hash values. Instead of the actual tj, tH and eH values, the transaction record may include a hash value computed over the tj, tH, and eH values. The transaction record may contain unhashed values of the key-value pairs 430-432, 470-472, or it may contain hash values of the key-value pairs, the key data and/or or the value data. The key-value pairs 430-432, 470-472, or data values corresponding to key value pairs 430-432, may be stored in another data store, and transaction records 420, 460 may include the file name, address, offset, or other location data identifying the location of the separately-stored key-value pairs or value data. The separately-stored value data or key-value pairs may be stored in a compressed format or encrypted formats as described above with respect to the transaction records illustrated in FIG. 2.

Transaction leaf 440 illustrates the transaction leaf corresponding to transaction record 420 (transaction no. i) that is inserted into incremental hash tree 400. Data can be stored in transaction leaf 440 in different configurations, formats, and embodiments, as illustrated in the following examples. Transaction leaf 440 may include transaction number 422, tj value 436, tH value 438, LH value 424, and eH value 426. Some or all of these values may be hashed. For example, transaction leaf 440 may contain a hash computed over the transaction number 422, LH value 424, and the hash computed over tj value 436, tH value 438, and eH value 426. Transaction leaf 440 may contain, by itself or with other data, LH 424, a hash of LH 424, or a different value derived from LH 424. Transaction leaf 440 preferably does not include key-value pairs 430-432 or optional transactional transaction metadata, for example, e #value 428.

At the instant when transaction leaf 420 is being constructed, incremental hash tree 400 includes transaction leaves 450, including transaction leaf $L_0$ 442, containing cryptographic linking metadata corresponding to transaction no. 0, transaction leaf $L_s$ 444, containing cryptographic linking metadata corresponding to transaction no. s, and 0 or more additional leaves 448 for transactions subsequent to transaction no. s. Transaction leaf $L_j$ 440 is appended to transaction leaves 450 at location 446, as the most recent transaction leaf in incremental hash tree 400.

Because the linear process of appending a new transaction record to the transaction data file and the binary process of appending the corresponding transaction leaf to the incremental hash tree may proceed at different rates, a new transaction record can be successfully appended to the transaction data file before the corresponding transaction leaf can be successfully appended to the incremental hash tree. In an embodiment, the values for tH (438) and tj (436) in transaction record 420 (for transaction no. i) correspond to a previous successful addition of a transaction leaf to the incremental hash tree 400. FIG. 4 illustrates the most recent successful-appended transaction leaf as transaction leaf $L_s$ (444) corresponding to transaction no. s, and tj field 436 in transaction record 420 and transaction leaf 440 would include the value s. The transaction no. s may refer to the immediately preceding transaction, i.e., transaction i−1, in which case the value in tj field 436 in transaction record 420 would equal i−1. Or the transaction no. s may correspond to another transaction (not illustrated) that was appended tens, hundreds, thousands, or more of transactions before the current transaction number i. When transaction leaf $L_i$ (440) (with tj field 436 value s) is appended to incremental hash tree 400 at leaf position 446, there may be 0 or more intervening transaction leaves between leaf $L_s$ (444) and transaction leaf $L_i$ (446). In an embodiment, the tH value 438 in transaction record 420 and transaction leaf 440 always reflects the current root hash value of the incremental hash tree after the successful addition of the transaction leaf corresponding to the prior transaction number tj 436. Preferably the incremental hash tree is a binary tree.

FIG. 6 illustrates an exemplary method 600 for adding a new transaction record for transaction number i containing n key-value pairs ($K_i0V_i0$-$K_inV_in$) to a transaction data file. In step 610, a hash tree is computed over the n key-value pairs ($K_i0V_i0$-$K_inV_in$. In step 620, root hash $eH_i$ is computed from the hash tree of key-value pairs $K_i0V_i0$-$K_inV_in$. In step 630, a value for tj is obtained, where tj identifies the position on the incremental hash tree of a successfully-inserted transaction leaf for a transaction txj, preferably the most recent successfully-inserted leaf. In step 635, a value for tH is obtained where tH is the root hash of the incremental hash tree after successful insertion of the transaction leaf corresponding to transaction txj at position tj. In step 640, the value $LH_i$ is computed with a linear accumulative hash of metadata from immediately-previous transaction $LH_{i-1}$ along with transaction number i. tj, tH, and $eH_i$. In an embodiment, $LH_i$ is a hash value computed over transaction number I, $LH_{i-1}$, and a hash value computed over tj, tH, and $eH_i$. In step 650, transaction record $tx_i$ is constructed with transaction number i, tj, tH, $LH_i$, $eH_i$, and key-value data. In an embodiment, the key-value data in transaction record $tx_i$ includes key-value pairs $K_i0V_i0$-$K_inV_in$. (In other embodiments, some of the fields may be stored as hash values, and the data values corresponding to key value pairs $K_i0V_i0$-$K_inV_in$, or the key-value pairs, may be stored in another data store, and the key-value data in transaction record $tx_i$ includes the file name, address, offset, or other location data identifying where the separately-stored data is stored.) In step 655, the new transaction record $tx_i$ is appended to the end of the transaction data file. In step 660, a new transaction leaf for the incremental hash tree is created containing transaction number i, $LH_i$, tj, tH, $eH_i$ and/or hash values of one or more of these data elements. In step 670, the new transaction leaf data is appended to the incremental hash tree, intermediate hash nodes are created, and the root hash value is recomputed.

Preferably, there is one unique linear order of transactions appended to the transaction data file and the incremental hash tree. In an embodiment the unique linear ordering is determined by the ordering in which transactions are appended to cryptographically linked transaction data file. In an embodiment in which the cryptographically linked transaction data file is distributed over multiple data stores or computing systems, or in which the methods of appending transactions to the transaction data file and/or the incremental hash tree are performed by different processes or threads, different processors, or different computer systems, the unique ordering can be enforced or synchronized by the software system processing append transactions and may use, for example, file locks or record locks or any other synchronization method. In an embodiment, the different components are organized in a master-slave configuration. The current master (under the operative protocol) is responsible for determining the order in which transactions are processed and distributed, and committing the transaction once a sufficient number of slaves or peers have successfully received the transaction. In an embodiment, a consensus protocol, for example Raft, is used to ensure that all peers process the same transactions in the very same order.

Interpreting the state of the data file as the list of transactions, the hash value calculated for any transaction (including relevant data of the transaction and the hash of the previous one) captures the notion of state. A small change of any of the values used to calculate the hash will produce a very different and unpredictable value with a high probability. The additional metadata elements tj and tH (in an embodiment) are derived from previously-cryptographically linked data and preserves the order imposed by it. The root of the incremental hash tree generated from the cryptographically linked data can also be considered as the state of the data file, since any change on the transactions will produce a very different value (with a high probability). Thus, each transaction includes linear and binary cryptographic links to prior transactions. It is possible to construct a cryptographic proof to demonstrate not only that two transactions are included in the transaction data file but also that one transaction was stored before the other.

The data reflecting the state of the cryptographically-linked transaction data file, including a root hash value of the incremental hash tree and the linear hash values in a transaction record stored in the transaction data file, can be cryptographically signed and/or distributed among other system or actors. In an embodiment, the system may be provisioned with a private key and then share a signed root or linear hash value with client applications (including auditors). When signed root or linear hash values are published or otherwise made available, it is not possible for anyone to tamper with or alter transactions without being eventually noticed by any of the database state holders. If root or linear hash values are signed, any client or agent can demonstrate that any proof was legitimately offered by the system and has not been altered. In other words, a signed root or linear hash value is authoritative evidence of a state of the hash tree or the cryptographically-linked transaction data file as of a specific transaction.

In an embodiment, a cryptographic proof is a list of hash values that can be used to recalculate the root of a hash tree, by following the same algorithm/steps used to originally calculate the root of the hash tree. A cryptographic proof can be interpreted as a partial state on the calculation of the root of a hash tree that can be provided to a client, auditor, or other interested party to resume and complete the calculation of the root of the hash tree. For example, the client or interested party may have received a root value, or signed root value, after storing a specified transaction, and the client now wants to recalculate the signed root from the data he holds and the list of hashes in a cryptographic proof.

In an embodiment, the additional metadata elements tj and tH included in each transaction record (in the transaction data file) and each transaction leaf of incremental hash tree 400 can be used to significantly reduce the number of values needed to generate a cryptographic proof to validate any transaction.

FIGS. 10(a)-10(c) contain pseudocode illustrating aspects of an embodiment of a linear cryptographic proof.

FIG. 10(a) contains pseudocode 1010 illustrating an exemplary embodiment of a process of computing an accumulative linear hash value, for example, the LH value in FIGS. 2-4, for a transaction. The accumulative linear hash value is computed over the following values: (a) the transaction ID (TxID); (b) the accumulative hash value (Alh) up to the previous transaction (prevAlh); and (c) the hash value calculated from (i) the transaction id of the transaction that was most recently appended to the incremental hash tree (blTxID) (corresponding to tj in FIG. 4); (ii) the root hash of the incremental hash tree after this transaction (blTxID) was appended (blRoot) (corresponding to tH in FIG. 4); and the root hash of the transaction hash tree calculated from the entries of the transaction (txH) (corresponding to eH in FIG. 4).

FIG. 10(b) contains pseudocode 1020 illustrating an exemplary embodiment of a process of constructing a linear cryptographic proof for transactions between a "trusted" transaction (trustedTxID) and a target transaction (targetTxID). The "trusted" transaction may be a transaction for which the requester has an authoritative value, for example, a signed accumulative linear hash value. The linear proof returns a list (or array) of hash values that can be used to compute the accumulative linear hash of a subsequently transaction. The initial value in the array of hash values is the accumulative linear hash in the trustedTxID transaction. Each additional element corresponds to the hash value calculated for the subsequent (or subsequently-stored) transaction, up to the target transaction number. The linear proof data can be used to confirm that all transactions between the source and target transactions are valid transactions.

FIG. 10(c) contains pseudocode 1030 illustrating an exemplary embodiment of a process of verifying a linear cryptographic proof from a list of hash values (the proof), the source transaction ID, the target transaction ID, the source accumulative hash value, and the accumulative hash value in the target transaction. This code can be used to calculate a hash value from the list of hashes returned by pseudocode 1020, comparing the first hash against source accumulative hash, and the resulting value with the target accumulative linear hash. In an exemplary use case, the requester has authoritative data for the linear hash value for the source transaction ID, and in addition a local list of subsequent transactions up to the target transaction number; and the requester wants to confirm that the linear hash value she has computed for her local list of subsequent transactions matches the linear hash value for the list of subsequent transactions stored in the transaction data file.

A dual proof (or dual cryptographic proof) combines linear cryptographic linking, i.e., transactions include the linear accumulative hash up to the previous one, with binary cryptographic linking generated by appending the linear accumulative hash values into an incremental hash tree, whose root is also included as part of each transaction and thus considered when calculating the linear accumulative hash. Similar to a linear proof, a dual proof can generate data for the calculation of the accumulative hash value of the target transaction from the linear accumulative hash value up to source transaction. The objectives of a dual proof are the same as the linear proof, that is, to prove that transactions have been appended to the transaction file and to prove that the data in the transaction file has not been tampered with or altered since the previously validated transaction.

FIG. 11 contains pseudocode illustrating aspects of an embodiment of a dual cryptographic proof 1110 between a source transaction number (sourceTx) and a target transaction number (targetTx). The dual proof in an embodiment returns four types of proof data, depending on how the sourceTx and targetTx transaction numbers compare to the transaction id of the transaction that was most recently appended to the incremental hash tree (blTxID).

The first type of proof data, computed by pseudocode element 1120, is a binary inclusion proof, to the extent it is readily available in the incremental hash tree. If the source transaction number is smaller than the blTxID of the target transaction number, it means that the incremental hash tree includes transaction data for every transaction from the source transaction to the blTxID of the target transaction. An inclusion proof can be readily generated from the incremental hash tree for this class of transactions. The first type of proof data returned by the dual cryptographic proof is a list of hash values that can be used to prove that the source transaction and the target transaction are included on the same incremental hash tree, i.e., the incremental hash tree with root hash value blRoot after transaction blTxID was appended to the incremental hash tree.

In an embodiment, the dual proof includes a second type of proof data, a binary consistency proof, computed by pseudocode element 1130. If the blTxID value of the source transaction number is non-zero, it means that the incremental hash tree includes a source subtree, i.e. a subtree of transactions through blTxID of the source transaction, and a target subtree, meaning a subtree of transactions through blTxID of the target transaction. The second type of proof data is a consistency proof, i.e., a list of hash values that can be used to prove that the target subtree includes the source subtree plus, possibly, additional values. This second type of proof data shows that the tree is incremental, and the transaction data before the source transaction number remains the same. This second type of proof data is readily available in the incremental hash tree.

In an embodiment, the dual proof includes a third type of proof data computed by pseudocode element 1140 if the blTxID for the target transaction number is non-zero. This third proof element is a binary inclusion proof containing a list of values that can be used to confirm that that blRoot value for the target transaction is the root hash value obtained by adding the transaction number blTxID to the incremental hash tree. This third type of proof data is readily available in the incremental hash tree.

The fourth type of proof data, computed by pseudocode element 1150, is a linear proof as discussed in connection with FIG. 10(*b*). The fourth type of proof data is a list of hash values which can be used to confirm the validity of all transactions between (a) the larger of the source transaction number or the target transaction blTxID, and (b) the target transaction number.

In summary, if the source transaction number is greater than or equal to the blTxID of the target transaction, the dual proof 1110 returns linear cryptographic proof data for all transactions between the source transaction and the target transaction. If the source transaction number is less than the blTxID of the target transaction, the dual proof returns binary inclusion proof data (for transactions from the source transaction through the target transaction blTxID) plus linear proof data for the shorter list of transactions from the target transaction blTxID through the target transaction number. The proof function also may include the consistency proof and the inclusion proof (for target transaction blTxID) described above.

FIG. 12 contains pseudocode illustrating an embodiment of verification of a dual cryptographic proof 1210. In pseudocode element 1220, the verification code evaluates the first component of dual proof data, i.e., the inclusion proof data returned when the source transaction number is less than the transaction number blTxID.

In pseudocode element 1230, the verification code evaluates the second component of dual proof data, i.e., the binary consistency proof data returned when there is a non-zero value for the source transaction blTxID.

In pseudocode element 1240, the verification code evaluates the third component of dual proof data, i.e., the binary consistency proof data returned when there is a non-zero value for the target transaction blTxID.

In pseudocode element 1250, the verification code evaluates the linear proof data returned as the fourth component of dual proof data. A process for evaluating a linear proof is discussed above in connection with FIG. 10(*c*). The proof data to be evaluated will include hash values for every transaction between the source transaction and the target transaction or, if the source transaction number is less than the target transaction blTxID, a shorter list of hash values for all transactions between the target transaction blTxID and the target transaction numbers.

A transaction may include multiple key-value pairs. In an embodiment, it is possible to provide inclusion and/or consistency proofs to confirm that a specified key-value pair or list of key-value pairs is included in a transaction. The transaction record contains the list of key-value entries (or, in an embodiment, location information identifying where the key-value data is stored). The keys and corresponding value data can be extracted from where they are stored and the transaction hash-tree for all key-value pairs in the transaction (including the specified key-value pair(s)) can be rebuilt to derive the root hash value for the rebuilt transaction hash tree, which can be compared to the EH value in the transaction record. An inclusion proof can be generated for the transaction hash tree for the transaction record where the key-value pairs are stored. The inclusion proof may be completed with linear or dual proofs to demonstrate the validity of the transaction.

In an embodiment, an index data structure is generated to speed up retrieval of actual key-value data or position in the incremental hash tree based on key value. An indexing data-structure can be generated before or after data is committed into the second cryptographic data-structure. The index data structure may be populated with the key and location of the value, which may be another location, another file, or an offset to a given file. The index can be used to locate actual key-value data as well as its corresponding position into the hash tree. In an embodiment, the index data structure is a b-tree in which leaves are lexicographically sorted. Using this data-structure it is possible to efficiently lookup the actual location of a value by the key prefix. Other data-structures can be used as index as well once a transaction is processed and the key-value pairs are stored.

Figure 8:
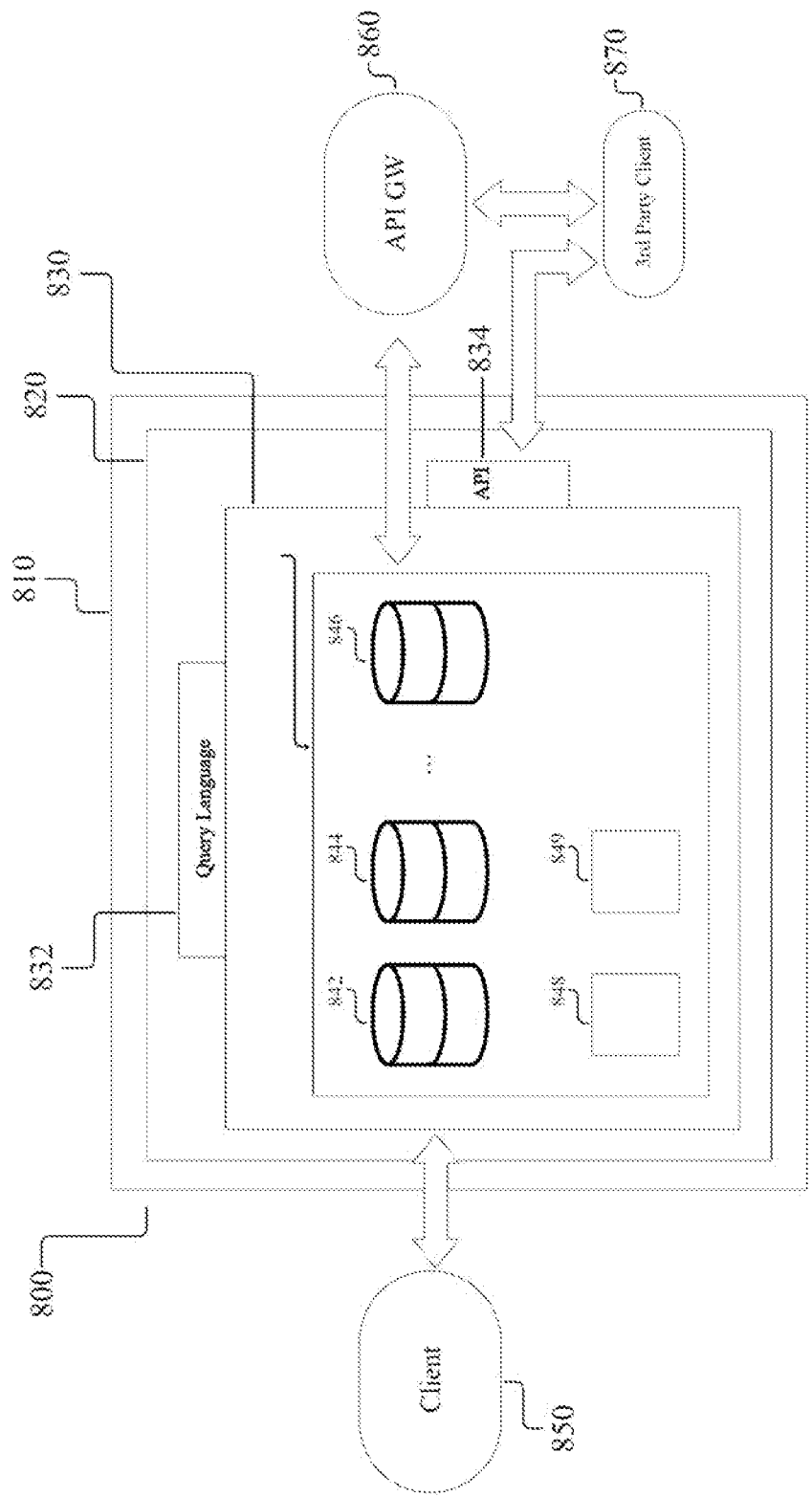
FIG. 8 illustrates an exemplary system environment.

FIG. 8 illustrates an embodiment of an environment 800 to support and implement the methods and systems described herein. Environment 800 includes computing system 810, which hosts the software and hardware resources required to implement the methods described herein, and includes one or more computers. Each computer includes memory to store data and the computer software and instructions that implement the methods described herein, at least one processing unit to execute the computer software and instructions, persistent or non-transitory storage to store data, and network/communication subsystems to network and communicate with other computer systems. One or more computers may be virtual. The computers are preferably connected via one or more networks, and software tasks and data storage may be distributed over one or more computers. Computing system 810 may be deployed in whole or in part on on-premises computer(s) or hardware appliance(s), or in the cloud. Computing system 810 may include one or more web servers, application servers, or data servers.

Computing system 810 includes software system 820. Software system 820 includes the software and instructions to implement the methods described herein. Software system 820 also includes software and instructions, including application software. Software system 820 includes user interface software, including one or more APIs 834, to communicate with, ingest, receive or respond to requests for data from, and provide access to the system to, authorized clients 850 and third-parties 870. Software system 820 may also support an API gateway 860. In an embodiment software system 820 provides firewall and other security functions to perform authentication and prevent unauthorized access to the system. Software system 820 in an embodiment includes query language software and interface 832 for accessing and querying the one or more data stores in core 840.

Software system 820 includes core 830, which provides the software to support core system applications and persistent data storage management. Core 830 includes one or more persistent data stores 842, 844, and 846. Persistent data stores 842, 844, 846 may be used for storing system data, application data, performance metrics, sensor data, digital documents, log data, client transaction data, for example one or more cryptographic key-value data stores, value store, transaction metadata, such as one or more Merkle tree or incremental hash trees, or any other collection of data. One or more persistent data stores may include a relational database, a no-SQL database, a directory, a key-value store, an append-only data file, or any other data file or data structure operative to store data for use by a computer application or system. Persistent data stores 842, 844, 846 may include data or metadata for one or more clients. Client transaction data (for example, key-value data store) or metadata (for example, an incremental hash tree) may be subdivided or stored in one or more parts or partitions stored in persistent data stores 842, 844, and 846. Core 830 may include, in an embodiment, other application software or software modules 848 such as a consistency checker and incremental hash tree constructor. Core 830 may include an indexing data structure, which preferably is stored in persistent data stores 842, 844, 846, and indexing software 849 to administer the indexing data structure.

Figure 9:
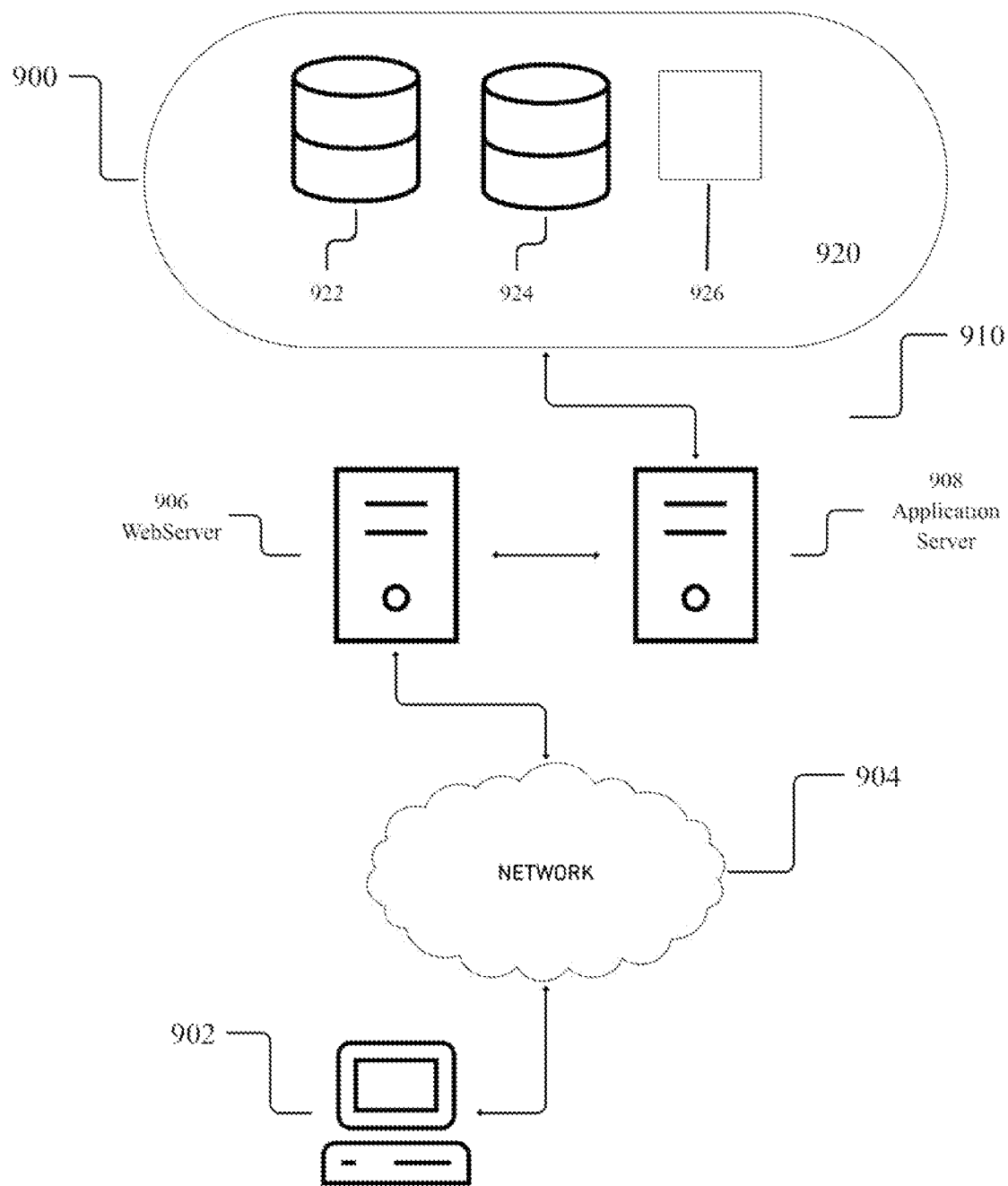
FIG. 9 illustrates an exemplary hardware environment.

FIG. 9 illustrates aspects of an exemplary embodiment of a hardware environment 900 for implementing the methods and systems described here. The exemplary environment 900 includes an electronic client device 902, which can include any appropriate device operable to send and/or receive requests, messages, or information over an appropriate network 904 and, in some embodiments, convey information back to a user of the device. Examples of such client devices include personal computers, workstations, servers, cell phones, smart phones, handheld messaging devices, laptop computers, tablet computers, set-top boxes, personal data assistants, embedded computer systems, electronic book readers, and the like. The network 904 can include any appropriate network, including an intranet, the Internet, a cellular network, a local area network, a satellite network, or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In an embodiment, the network includes the Internet, the World-wide Web, and/or other publicly-addressable communications network, and the environment includes a web server 906 for receiving requests and serving content in response thereto, although for other networks an alternative device serving a similar purpose, or web server software implemented on an application server, could be used as would be apparent to one of ordinary skill in the art.

The illustrative environment includes computing system 910 and software system 920, for example, in an embodiment, computing system 810 and software system 820 shown in FIG. 8 and described above. In an embodiment, computing system 910 includes at least one application server 908 (which may include one or more data stores), and in an embodiment application server 906 and web server 908 may be combined. It may also include one or more data servers hosting one or more data stores (not shown). It should be understood that there can be several application servers, layers, or other elements, processes, or components, which may be chained or otherwise configured, which can interact to perform tasks such as hosting or obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and computer-readable data storage media, in any standard, distributed, virtual, or clustered environment. The term "non-transitory data store" refers to a data store comprising non-transitory storage media. The application server can include any appropriate hardware, software, and firmware for integrating with the data store as needed to execute aspects of one or more applications for the client device, handling some or all of the data access and business logic for an application. In an embodiment the application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. In an embodiment, content transferred to a client device 902 may be processed by the client device to provide the content in one or more forms including, but not limited to, forms that are perceptible to the user audibly, visually, and/or through other senses. The handling of all requests and responses, as well as the delivery of content between the client device 902 and the application server 908, can be handled by optional web server 906 using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

Software system 920 can include several separate data tables, databases, data documents, dynamic data storage schemes, and/or other data storage mechanisms and media for storing data relating to a particular aspect of the present disclosure. For example, software system 920 may store or host one or more cryptographically-linked transaction data files 922 and/or incremental hash trees 924. The data store illustrated may include mechanisms for storing production data, client data, and user data, which can be used to serve content for the production side. The data store also is shown to include a mechanism for storing log data, which can be used for reporting, analysis, or other such purposes. Software system 920 may also include application code software, modules, and/or logic 926 operable, through logic associated therewith, to receive instructions from the application server 908 and obtain, update, or otherwise process data in response thereto.

Each server typically will include an operating system that provides executable program instructions for the general administration and operation of that server and typically will include a computer-readable storage medium (e.g., a hard disk, random access memory, read only memory, etc. storing instructions that, when executed (i.e., as a result of being executed) by a processor of the server, allow the server to perform its intended functions. The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the hardware environment 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as containers, virtual machines, hypervisors, and other virtual devices capable of communicating via a network.

Various embodiments of the present disclosure utilize at least one network 904 that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UPnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server 906, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java (registered trademark), Go, C, C#, or C++, or any scripting language, such as Ruby, PHP, Perl, Python, or TCL, or Net, and NodeJS, as well as combinations thereof. The server(s) may also include database servers, including without limitation those commercially available from Oracle (registered trademark), Microsoft (registered trademark), Sybase (registered trademark), and IBM (registered trademark), as well as open-source servers such as MySQL, Postgres, SQLite, MongoDB, Redis, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. In an embodiment, computing system 910 resides on a single machine. In alternative embodiments, computing system 910 resides in a variety of locations, such as on a storage medium local to (and/or resident in) one or more of the computers or remote from any or all of the computers across the network. The information may reside in a storage-area network ("SAN"). Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory, as described above. The computer-readable storage media reader can be connected with, or configured to receive, a computer-readable storage medium, representing remote, local, fixed, and/or removable storage devices as well as storage media for persistently, or temporarily and/or more permanently, containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory, or other memory technology, Compact Disc Read-Only Memory ("CD-ROM"), digital versatile disk (DVD), or other optical storage, magnetic cassettes, magnetic tape, magnetic disk storage, or other magnetic storage devices or any other medium which can be used to store the desired information and which can be accessed by the system device.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors.

The computer-readable storage media described herein may be non-transitory. The term "non-transitory," as used herein, defines a characteristic of the medium itself (i.e., tangible, not a signal) as opposed to a characteristic of data storage persistency (e.g., RAM vs. ROM). In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code.

Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The improvements described herein are improvements in a technology or technical field (e.g., computer-implemented data storage, cryptographically-linked computer data storage, and computational techniques for verifying data originality or integrity); provide improvements in the functioning of the computer itself (for example, by providing for shorter cryptographic proofs, which can be produced and confirmed faster, with fewer computation cycles, consume less memory for storage, and result in smaller packet sizes for more efficient transmission over a communications channel); and add specific limitations other than what is well-understood, routine, or conventional in the field (including, for example, methods and systems for generating dual cryptographic proofs based on linear and binary cryptographic linking approaches and using the root of an incremental hash tree calculated up to some previous transaction, not necessarily the immediate previous one). Further, the processes described here, including without limitation the computation of accumulative hash values, adding new leaves to a Merkle hash tree, and generating and verifying cryptographic proofs, are computation-intensive, cannot practically be performed mentally, and outside of trivial cases or teaching examples cannot be performed mentally for any useful number of transactions.

Although embodiments of the present invention have been described in detail, it will be apparent to those skilled in the art that many embodiments taking a variety of specific forms and reflecting changes, substitutions and alterations can be made without departing from the spirit and scope of the inventions disclosed herein. The described embodiments illustrate the scope of the claims but do not restrict the scope of the claims.

What is claimed is:

1. A computer-implemented method of adding data to a cryptographically-linked transaction data file, comprising:
   under control of one or more computer systems configured with executable instructions and operatively coupled to a data store comprising a cryptographically-linked transaction data file, said cryptographically-linked transaction data file comprising a plurality of cryptographically-linked transaction records, said plurality comprising a first cryptographically-linked transaction record, and an incremental hash tree having a plurality of leaves, wherein each leaf corresponds to a different cryptographically-linked transaction record in the cryptographically-linked transaction file,
   receiving transaction data, said transaction data comprising a plurality of key-value data pairs, for storage in the cryptographically-linked transaction data file;
   computing a current transaction hash value corresponding to the plurality of key-value pairs;
   computing a first transaction record hash value on metadata contained in the first cryptographically-linked transaction record;
   constructing a current transaction record comprising the current transaction hash value, the first transaction record hash value, and key-value information corresponding to the plurality of key-value data pairs;
   appending the current transaction record to the cryptographically-linked transaction data file;
   creating a new transaction leaf for the incremental hash tree, said new transaction leaf corresponding to the current transaction record and comprising current transaction linking data and first transaction linking data; and
   appending the new transaction leaf to the incremental hash tree.

2. The computer-implemented method of adding data to a cryptographically-linked transaction data file of claim 1, whereby a dual cryptographic proof can be generated from data stored in the cryptographically-linked transaction data file and data stored in the incremental hash tree.

3. The computer-implemented method of adding data to a cryptographically-linked transaction data file of claim 2, whereby the dual cryptographic proof is shorter than a linear cryptographic proof can generated from data stored in the cryptographically-linked transaction data file.

4. The computer-implemented method of adding data to a cryptographically-linked transaction data file of claim 2, wherein the dual cryptographic proof comprises an inclusion proof or a consistency proof pertaining to the transaction data.

5. The computer-implemented method of adding data to a cryptographically-linked transaction data file of claim 1, further comprising creating intermediate notes and recomputing the root hash value of the incremental hash tree.

6. The computer-implemented method of adding data to a cryptographically-linked transaction data file of claim 1, wherein the current transaction linking data comprises the current transaction hash value.

7. The computer-implemented method of adding data to a cryptographically-linked transaction data file of claim 1, wherein the first transaction linking data comprises the first transaction record hash value.

8. The computer-implemented method of adding data to a cryptographically-linked transaction data file of claim 1, wherein data components of the plurality of key-value data pairs are stored separately from the key components, and the key-value information corresponding to the plurality of key-value data pairs comprises location information for said value components.

9. The computer-implemented method of adding data to a cryptographically-linked transaction data file of claim 1, wherein the incremental hash tree comprises a Merkle tree data structure.

10. The computer-implemented method of adding data to a cryptographically-linked transaction data file of claim 1, wherein the incremental hash tree comprises a binary tree.

11. The computer-implemented method of adding data to a cryptographically-linked transaction data file of claim 1, wherein the incremental hash tree is stored external to, outside, or separately from the cryptographically-linked transaction data file.

12. The computer-implemented method of adding data to a cryptographically-linked transaction data file of claim 1, wherein the current transaction record further comprises cryptographic data from the incremental hash tree.

13. The computer-implemented method of adding data to a cryptographically-linked transaction data file of claim 1, wherein the current transaction record further comprises a root hash value of the incremental hash tree.

14. The computer-implemented method of adding data to a cryptographically-linked transaction data file of claim 1, wherein the current transaction record further comprises first transaction leaf data corresponding to a first transaction leaf in the incremental hash tree.

15. The computer-implemented method of adding data to a cryptographically-linked transaction data file of claim 14, wherein the first transaction leaf was successfully inserted into the incremental hash tree before the new transaction leaf and the first transaction leaf data comprises location data for the first transaction leaf in the incremental hash tree or the root hash value of the incremental hash tree after insertion of the first transaction leaf.

16. The computer-implemented method of adding data to a cryptographically-linked transaction data file of claim 15, wherein the first transaction leaf data comprises location data for the first transaction leaf in the incremental hash tree and the root hash value of the incremental hash tree after insertion of the first transaction leaf.

17. A computer system for storing cryptographically-linked transaction data, comprising:
 a non-transitory data store comprising a cryptographically-linked transaction data file comprising a plurality of cryptographically-linked transaction records, and an incremental hash tree comprising a plurality of leaves, wherein each leaf corresponds to a different cryptographically-linked transaction record in the cryptographically-linked transaction file; and
 a computer system operatively coupled to the non-transitory data store, wherein the computer system is programmed to:
  receive transaction data comprising a plurality of key-value pairs;
  construct a current transaction record comprising key-value information corresponding to the plurality of key-value pairs and first hash data linking the current transaction record to a previous transaction record, said previous transaction record having been previously stored in the cryptographically-linked transaction data file;
  append the current transaction record to the cryptographically-linked transaction data file;
  construct a new transaction leaf for the incremental hash tree, said new transaction leaf corresponding to the current transaction record; and
  append the new transaction leaf to the incremental hash tree.

18. The computer system for storing cryptographically-linked transaction data of claim 17, wherein the new transaction leaf corresponding to the current transaction record comprises current transaction linking data and first transaction linking data.

19. The computer system for storing cryptographically-linked transaction data of claim 17, wherein the current transaction record further comprises hash data from the incremental hash tree.

20. The computer system for storing cryptographically-linked transaction data of claim 17, wherein the computer system is further programmed to generate a dual cryptographic proof from data stored in the cryptographically-linked transaction data file and data stored in the incremental hash tree.

* * * * *